INVENTORS.
SARK PASHAIAN
JAMES M. STEWART
BY EMIL UMBRECHT

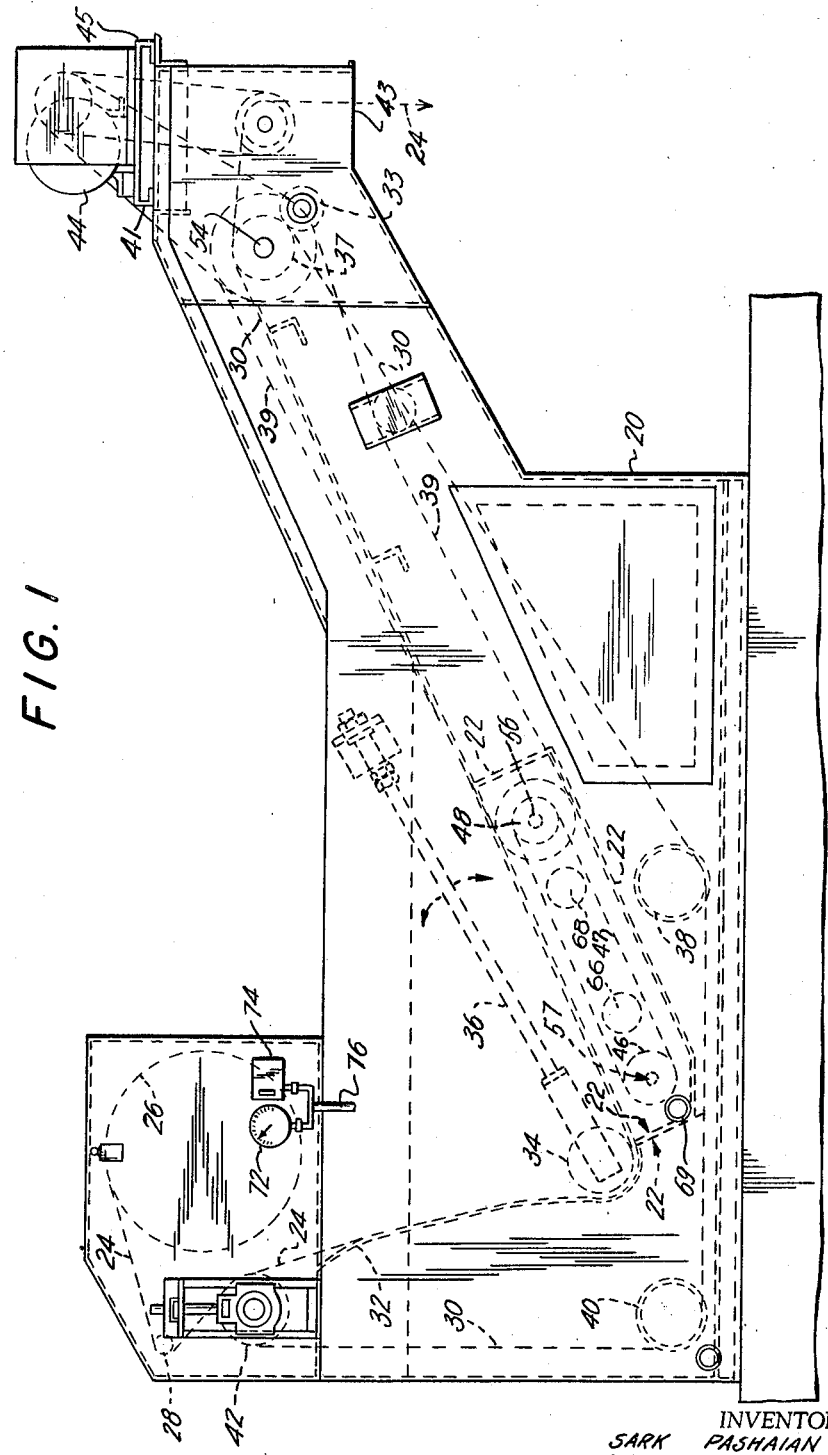

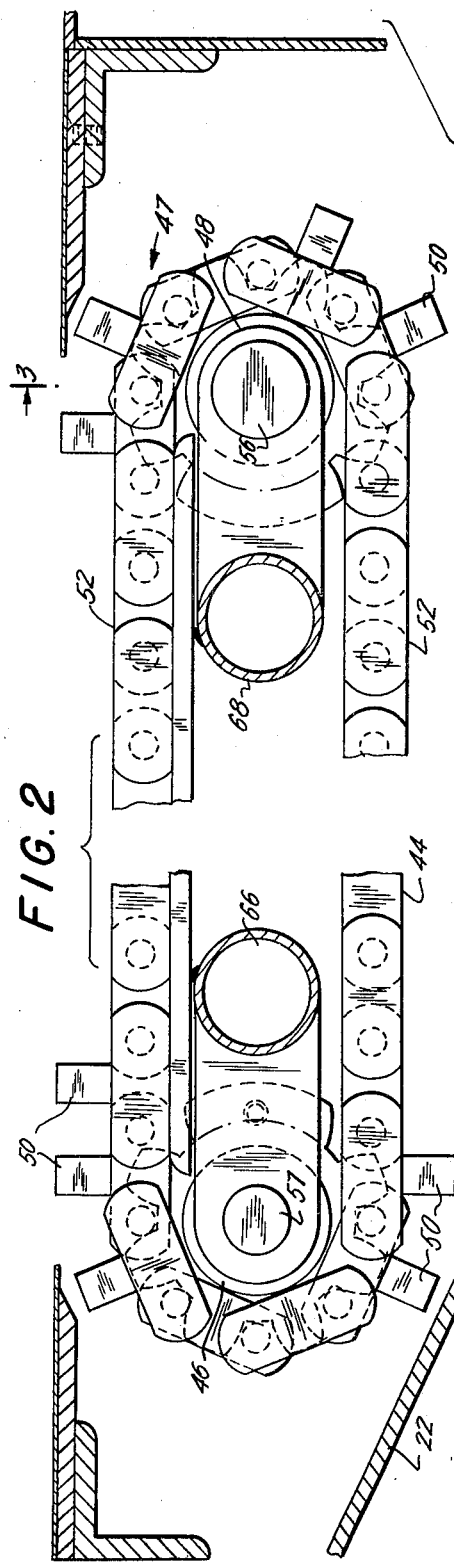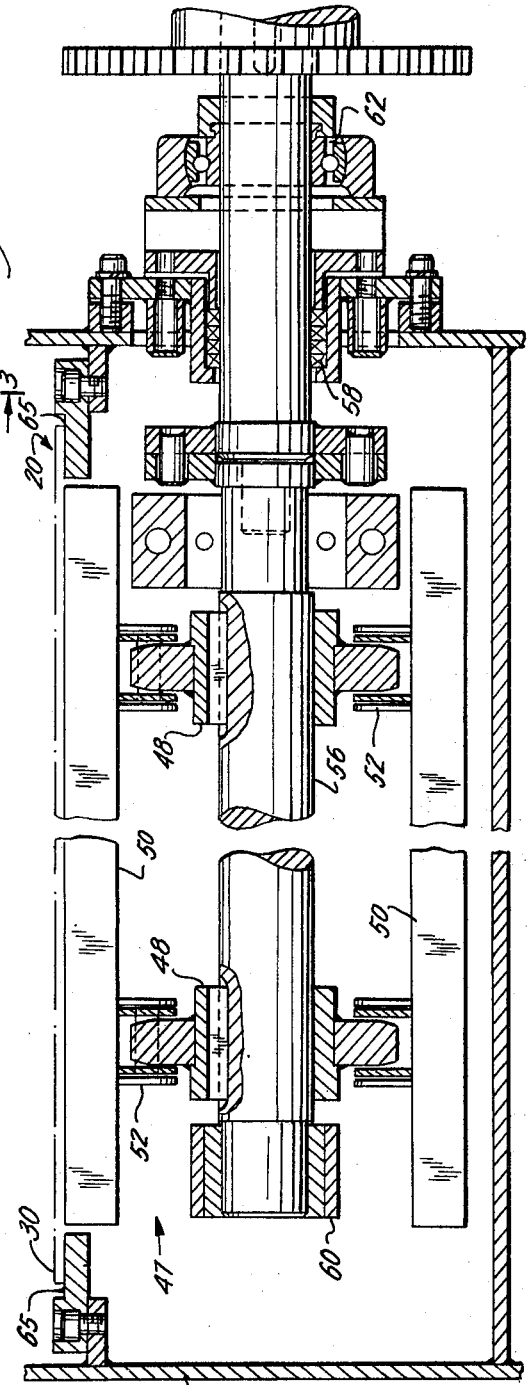

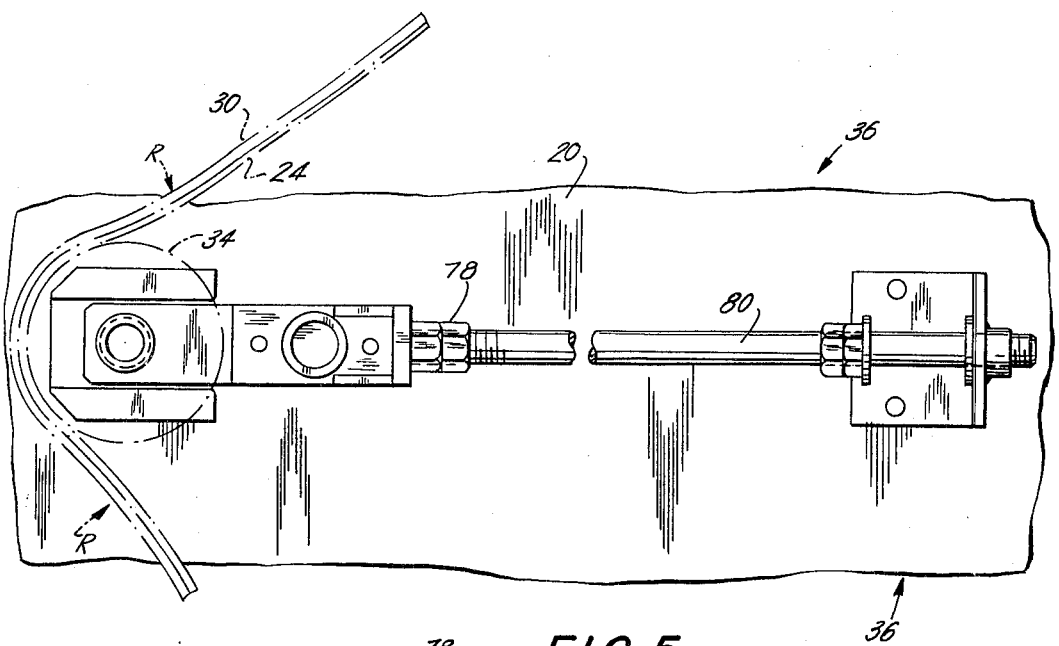
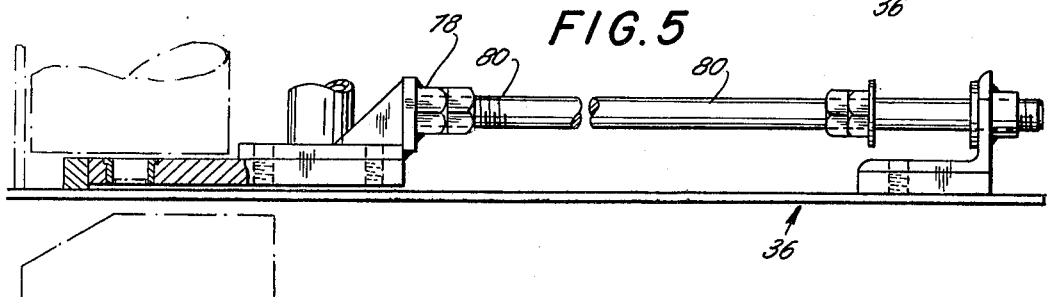
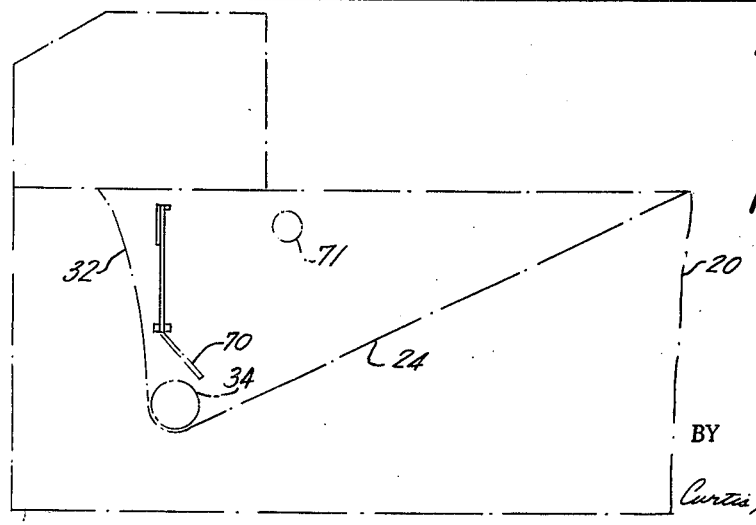

Curtis, Morris and Safford
ATTORNEYS

April 14, 1970 S. PASHAIAN ET AL 3,506,128
FILTER APPARATUS
Original Filed Feb. 7, 1964 6 Sheets-Sheet 5

INVENTORS.
SARK PASHAIAN
JAMES M. STEWART
EMIL UMBRICHT
BY
Curtis, Morris and Safford
ATTORNEYS INVENTORS.
SARK PASHAIAN
JAMES M. STEWART
EMIL UMBRICHT
BY
Curtis, Morris and Safford
ATTORNEYS _United States Patent Office_

3,506,128
Patented Apr. 14, 1970

3,506,128
FILTER APPARATUS
Sark Pashaian, Monroe, James M. Stewart, Dearborn, and Emil Umbricht, Northville, Mich., assignors to Ajem Laboratories, Inc., Livonia, Mich.
Continuation of application Ser. No. 343,335, Feb. 7, 1964. This application Mar. 28, 1967, Ser. No. 626,633
Int. Cl. B01d *33/00, 33/32, 33/40*
U.S. Cl. 210—400   6 Claims

ABSTRACT OF THE DISCLOSURE

A filtration apparatus with a suction box immersed in the liquid to be filtered and having an open face below the liquid level with spaced narrow bars constituting support means and an endless support belt with rollers positioned to guide the belt and drive it through the liquid and across the open face; a strip of filter medium feeds on to said belt before the suction box and is carried by it across the open face, being of a size such that the open face is covered by said strip, and thence out of the liquid and beyond to a discharge position; and means for removing liquid which passes into the suction box and maintaining suction within said box.

---

The present invention relates to an apparatus for filtering dirty fluids. More particularly, the invention relates to an apparatus for continuously filtering high volumes of fluid, which apparatus is easily maintained and may be operated continuously with a minimum of attention.

This is a continuation of our prior copending application Ser. No. 343,335, filed Feb. 7, 1964 and now abandoned, and a continuation-in-part of Ser. No. 562,060, filed Jan. 14, 1965, now U.S. Patent No. 3,347,378, issued Oct. 17, 1967, with subject matter previously disclosed in a copending application Ser. No. 328,673, filed Dec. 6, 1963 and now abandoned.

Filtration equipment that can be operated continuously is important. For example, in many industrial processing situations, it is undesirable to discard liquids because of direct economic considerations, for example when the liquid is relatively expensive cooling oil contaminated by dirt, and sometimes because of more indirect considerations, for example the desire to avoid a capital expenditure for more water supply lines or the necessity of conserving water induced by restricted local supply, or the necessity of avoiding pollution by discharging wastes.

In such continuous filtration operations, it is important to have a filter that may be operated continuously without excessive down-time for cleaning, advancing new filter medium, etc. Unless such downtime can be avoided, it may be necessary, during the filter-shut-down periods, to shut down also the processing operation to which the filtered liquid is being recycled, or to provide an auxiliary filtration unit, or to provide a storage unit maintaining a reservoir of pre-filtered liquid. These methods of mitigating the effects of non-continuous filtration require increased capital investment for greater plant floor space and the addition of equipment involved. Furthermore, frequent shutting down and starting up of suction pumps cause excessive wear on the pumps. Thus, it is important to have trouble-free continuous filtration equipment.

It is an object of the present invention to proivde filtration equipment that may be operated continuously with minimized maintenance and operator attention. It is another object of this invention to provide filtration equipment adapted for use of inexpensive filter media and capable, when desired, of heavy-duty filtration operations. Another object of the invention is to provide a compact filtration unit capable of handling relatively high rates of flow but using only a small amount of floor space. A further object of the invention is to provide a filtration apparatus having unique media conveying means. Another object is to provide a filter appaartus where turbulent liquid flow is prevented from interfering with the operation of the apparatus by unique baffling means.

These objects are served by the apparatus of the present invention.

The apparatus of the present invention provides filtration through a suction box which is advantageously mounted in a tank for holding a mass of liquid to be filtered. Within the suction box is mounted an endless carrier comprising slats, perforated sheet or other such permeable support means for filter medium. This carrier, flush with the open face of said suction box, is mounted on rollers and driven for advancing of the filter media, thus providing positive advancement of the media in the filtration area and thus avoiding the pulling of the media against the force of the pressure differential caused by the vacuum in the suction box and thus avoiding tearing the filter media during the advance. Conversely this positive advancement allows the use of filter media of relatively low tensile strength.

To achieve this advance at optimum intervals, a pressure-sensing device is advantageously mounted in the suction box. When the pressure drop across dirty filter medium increases to such a point that vacuum inside the suction box reaches a predetermined high value, the pressure-sensing device actuates an alarm to alert workmen to the need of a manual filter advance or, more advantageously, the pressure-sensing device actuates a motor whereby filter media is automatically advanced a predetermined distance to cover the suction box with clean filter media. Alternately, the filter media may be advanced until the pressure drop across the media decreases causing the pressure-sensing devices to inactivate the motor means.

Other features advantageously incorporated into the apparatus of the present invention include such auxiliary filter-medium conveying means as a specially-designed and controlled pressure roll and a special bowed surface which surface provides a support and preforming surface for filter media as it approaches the suction box. The pressure roll is utilized to hold the filter media in place as it approaches the suction box and aid the smooth distribution of the media over the width of the filtration area. This roll is advantageously spring-loaded and can be adjusted to maintain the desired tension on the filter media. This roll also serves to maintain the desired tension on support webs which may underlie the media and which are frequently used to support the filter media. This roll is advantageously of resilient material and is advantageously irregular in surface, for example corrugated or ribbed. The type of irregularity depends upon the nature of the solids in the liquid to be filtered. The corrugations etc. provide escape routes for solid material that might otherwise coat the roll.

The bowed surface over which the filter media is advantageously advanced is especially helpful when a filter support web is used. Bringing the filter media into contact with the support web normally presents the problem of trapping some air between the media and web which air causes wrinkling and can materially detract from the efficiency of the filtration operation. The bowed surface, on which the media may be more gradually brought into contact, allows more air to escape and thus is found a beneficial aspect of the apparatus herein disclosed.

After being advanced over the bowed surface and under the pressure roll, another slightly curved surface is advantageously passed over before the media is brought into contact with the pervious filtration surface. This curved surface helps to stretch the filter media and to iron out any wrinkles that may be present after the media passes under the pressure rolls.

The pressure roll is suitably maintained under the desired pressure by means of a tension control rod which, for example, may be directed to apply pressure in varying directions by merely shifting the position of the rod slightly.

In order to provide maximum protection of the filter media from contamination of its underside by sediment carried in the liquid to be filtered, baffles are advantageously provided in the tank which reduce the turbulence and splash caused by dirty liquid on its entry into the tank. When placed in suitable position, depending on the flow volume and inlet position of the dirty liquid, these baffles may advantageously serve such supplementary purposes as protecting the pressure roll from undesirable contamination by the dirty liquid.

Other features which are usefully incorporated into the described apparatus include means for tightening continuously the support web, and air- or liquid-cleaning means for such support webs.

In this application and accompanying drawings, we have shown and described a preferred embodiment of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

In the drawings:

FIGURE 1 is a side elevation view of filtration apparatus with a suction box with an endless belt therein.

FIGURE 2 is a side view in elevation of the endless belt in the suction box, as seen on a section plane 2—2 of FIGURE 7.

FIGURE 3 is a cross-sectional view of the suction box along line 3—3 of FIGURES 2 and 7.

FIGURE 4 is a fragmentary side elevational view of a pressure roll with its pressure-adjusting assembly.

FIGURE 5 is a fragmentary plan view of the pressure roll with its pressure adjusting assembly.

FIGURE 6 is a schematic view of the filtration apparatus showing the relative placement of a flow-control baffle.

Figure 7:
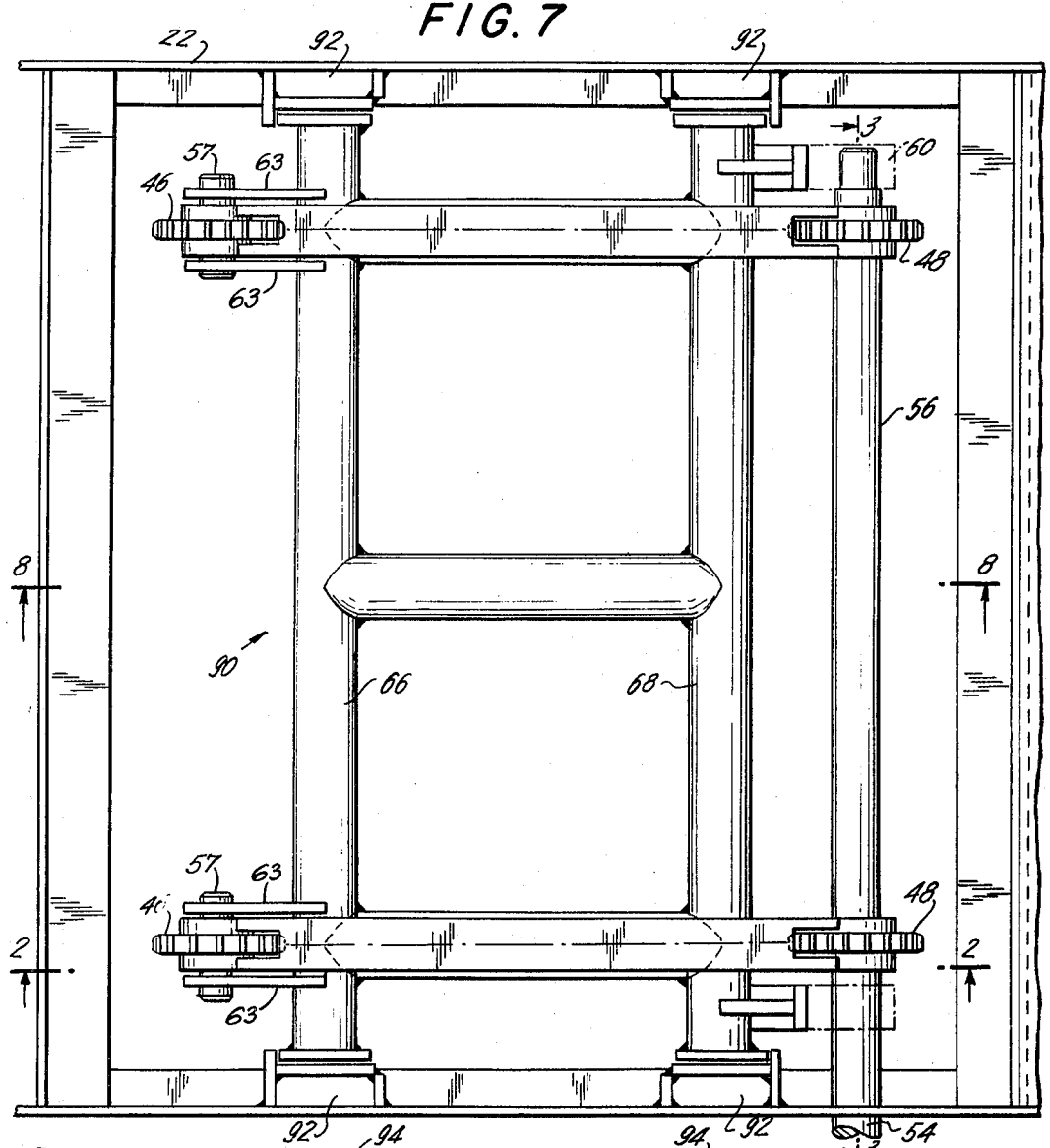
FIGURE 7 is a plan view of the suction box with the internal conveyor removed but showing its sprocket wheels.

Referring to FIGURE 1, tank 20 for holding dirty liquid to be filtered has mounted therein a suction box 22 over which filter media 24 is fed from filter media supply roll 26. The filter media is brought around idler roll 28 and onto a continuous belt support 30, over the bowed surface of lead-in form 32, under roll 34 of tension adjusting assembly 36, and over suction box 22. Thence the filter media is carried on support belt 30 around end roll 37 and disposed of. Support belt 30 is carried back between end roll 37 and pinch roll 33 thence around rolls 38, 40, and 42 and recycled for further use. The filter media is stripped from belt 30 at the end roll 37 and is discharged through exit port 43.

A motor 44 for driving the equipment is mounted on bracket 45 for driving the filter media support belt 30. This driving motor is connected by a sprocket chain 41 with a sprocket mounted outside tank 20 on the axle 54 of end roll 37, which in turn carries a second sprocket and chain 39 is adapted to synchronously drive support belt 30 through shafts 54 and 56 shown in FIGURES 1, 2 and 3.

Inside suction box 22, endless belts 47 which afford support for the filter media are mounted on sprocket wheels 46 and 48. This belt comprises (see FIGURES 2 and 3) filter media support bars 50 mounted on roller chains 52. Sprockets 48 are driven by means of drive shaft 54 which is coupled to sprocket-wheel shaft 56.

The interior of suction box 22 is sealed from the dirty liquid in tank 20 by seal 58. The shaft 56 rotate on interior bearings 60 and exterior ball bearing 62. Shafts 57 rotate in bearing brackets 63. Suction box frame members 66 and 68 are part of the belt supporting frame. Suction pipe 69 leads from suction box 20 through the wall of the tank to a suction pump (not shown).

Also shown in FIGURE 1 is a pressure gage 72 connected by tubing 76 to suction box 22. The pressure in suction box 22, when decreased to a certain value because of the increased resistance of accumulating filter cake to the flow of liquid to a suction pump, operates alarm 74 warning workmen that the media should be advanced by activating motor 44.

As shown in FIGURE 6, baffle 70 is advantageously placed in tank 20 above the suction box. This baffle, placed near the dirty liquid inlet 71 tends to reduce agitation and promote the rapid sedimentation of heavier dirt onto the filter. Furthermore, the baffle 70 controls liquid agitation and promotes the smooth meeting of filter media 24 and support web 30 minimizing wrinkling and irregularities in the composite filter sheet that is passed over the suction box.

Adjustable roll 34 is advantageously placed in cooperation with bowed surface 32, as seen in FIGURE 1, so that web 30 and filter media 24 have a transverse curve, both when approaching the roll and when leaving the roll and approaching the suction box. This has been found to help minimize air entrapment between web 30 and media 24.

Tension assembly 36 is shown in FIGURES 4 and 5. Tension on adjustable roller 34 may be controlled by adjusting nuts 78 on support rod 80.

Figure 8:
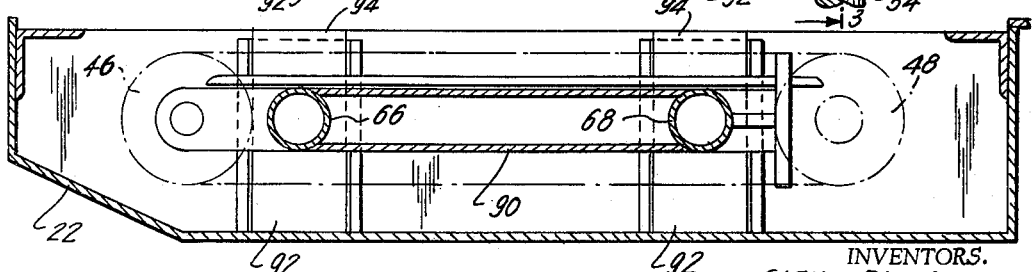
FIGURE 8 is a longitudinal sectional view of the suction box taken along section line 8—8 of FIGURE 7.

FIGURES 7 and 8 show an internal structure in suction box 22 which comprises a frame 90 having tubular members 66 and 68 on which bearings for sprocket wheels 46 and 48 and shaft 56 are mounted. This frame supports the walls of suction box 22 allowing use of relatively lower gauge material and also gives the necessary support for the conveyor mechanism. Frame 90 is shown mounted in locating slots 92 and being held in position by side bars 94. Thereby the frame may be easily removed for maintenance, if desired. For clarity, the suction box filter medium conveyor 47 is not shown in FIGURES 7 and 8.

Figure 9:
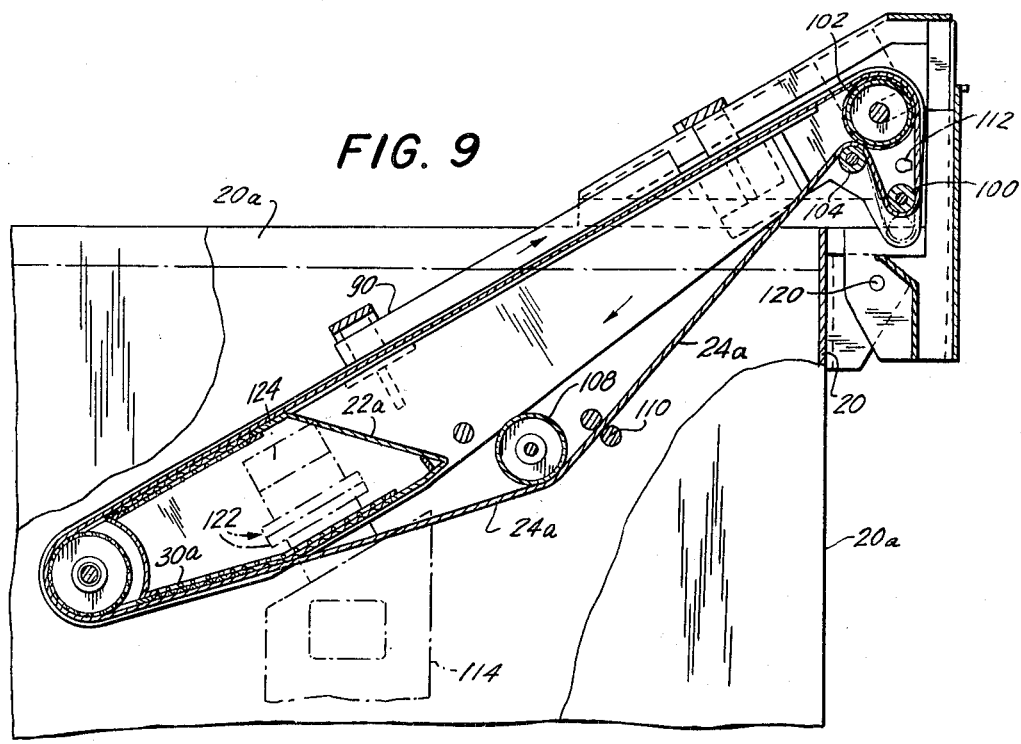
FIGURE 9 is a vertical sectional view of another embodiment of the invention, a filter apparatus, showing novel features thereof.

FIGURE 9 shows another embodiment of the present invention having several distinctive and advantageous features, and wherein filter media is a belt 24a continuously and endlessly advanced over a fixed metal screen 30a. Take-up rollers 100 are convex with a crown of about one-sixteenth inch as is head pulley 102. These "crowns" aid in maintaining the filter media in position. Pinch rolls 104 are correspondingly concave. This provides for resisting gradual sideways movement of the filter medium.

Roller 108 is positioned to allow the filter medium to be brought away from the main body of the suction box, thus allowing it to be cleaned by underwater cleaning means such as water jets 110. Another aid to cleaning is the directly downward path which the filter medium follows after leaving head pulley 102 and before being carried around roller 100. This downward motion provides a period during which cleaning can be effected as by air nozzles 112.

Figure 10:
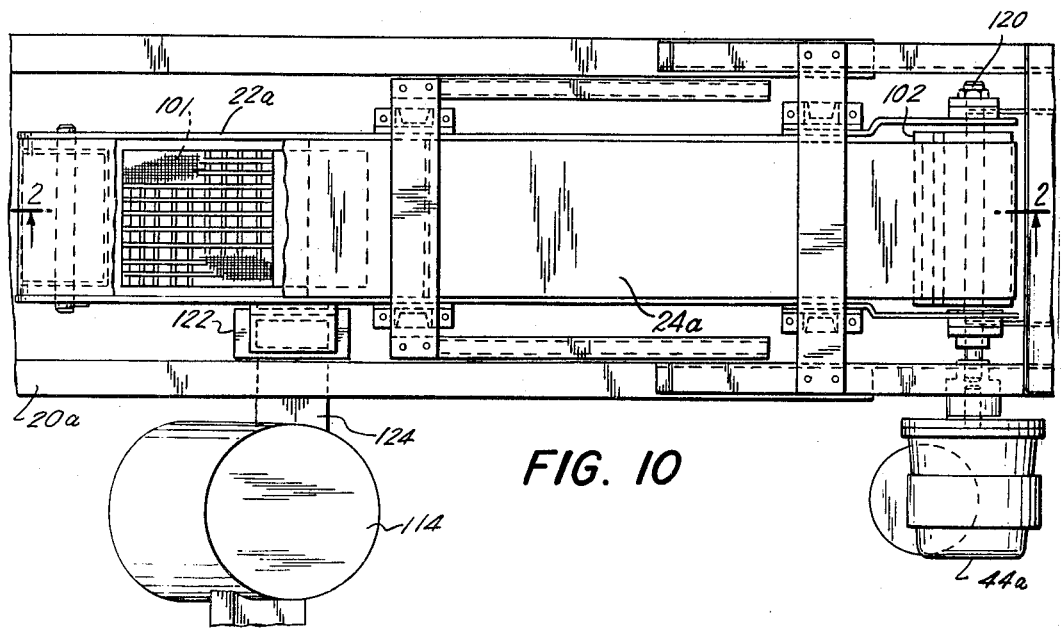
FIGURE 10 is a plan view of the same apparatus shown in FIGURE 9.

It is to be noted in FIGURES 9 and 10 that the main suction chamber or pump 114 is outside of the dirty liquid tank 20a and is thus more accessible for cleaning and maintenance.

The position of motor drive 44a as seen in FIGURE 10 is especially advantageous in that its weight may be used to counterbalance the weight of the filter assembly to aid the raising of suction box 22a out of the dirty liquid tank 20a around pivot 120. Flanges 122, seen in FIGURE 9, have resilient gaskets which provide means for sealing suction duct 124 when the suction box is resting on the flanges 122.

Figure 11:
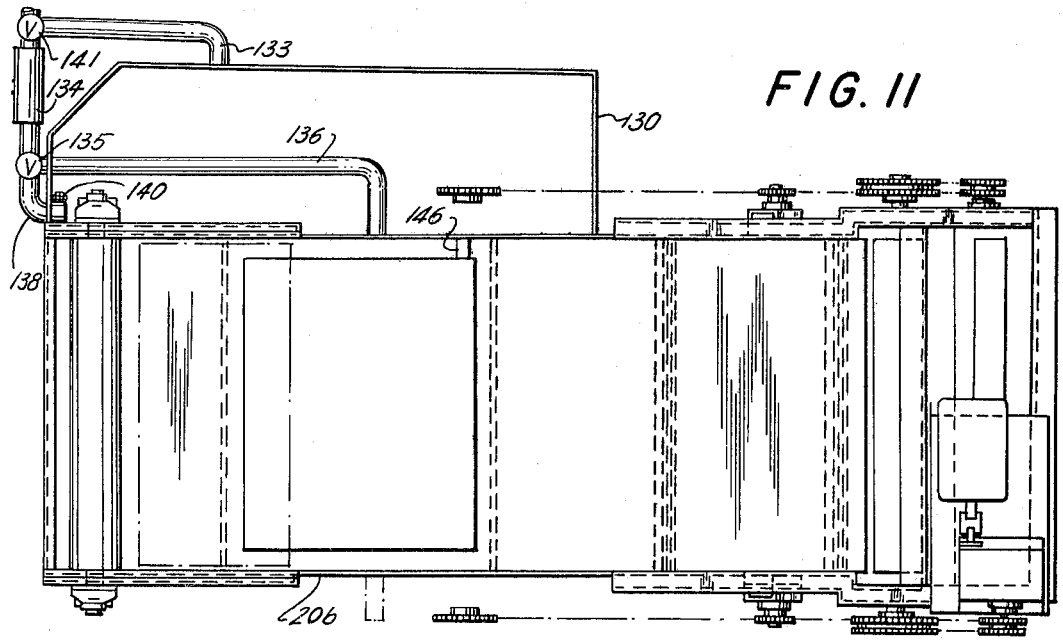
FIGURE 11 is a plan view similar to that of FIGURE 10 of an advantageous embodiment of the invention wherein a reservoir tank is mounted at the side of the apparatus.

Referring to FIGURE 11, an embodiment of the invention is seen that comprises a reservoir tank 130 useful in maintaining a continuous flow of clean filtrate to, for example, a machining operation. In normal operation, clean filtrate is sucked by pump 134 through line 136 (which passes through tank 130) and three-way valve 135. However, when it is necessary, for some reason to shut down the filter, clean filtrate is supplied through the duct 138, comprising a screen 140 for assuring removal of any foreign material from the filtrate, and three-way valve 135.

Filtrate is supplied to tank 130 by way of a three-way valve 141 and line 133 when required.

A weir 142 provides means for returning clean filtrate from tank 130 to dirty liquid tank 20b, thus providing means for continuing normal operation when the dirty liquid level in tank 20b tends to drop below the uppermost level of the suction box because of an interruption or diminution in the supply of dirty liquid. However, the weir is positioned at a level relative to tanks 130 and 20b so that liquid may also flow into tank 130 from tank 20b when operating circumstances so require.

Figure 12:
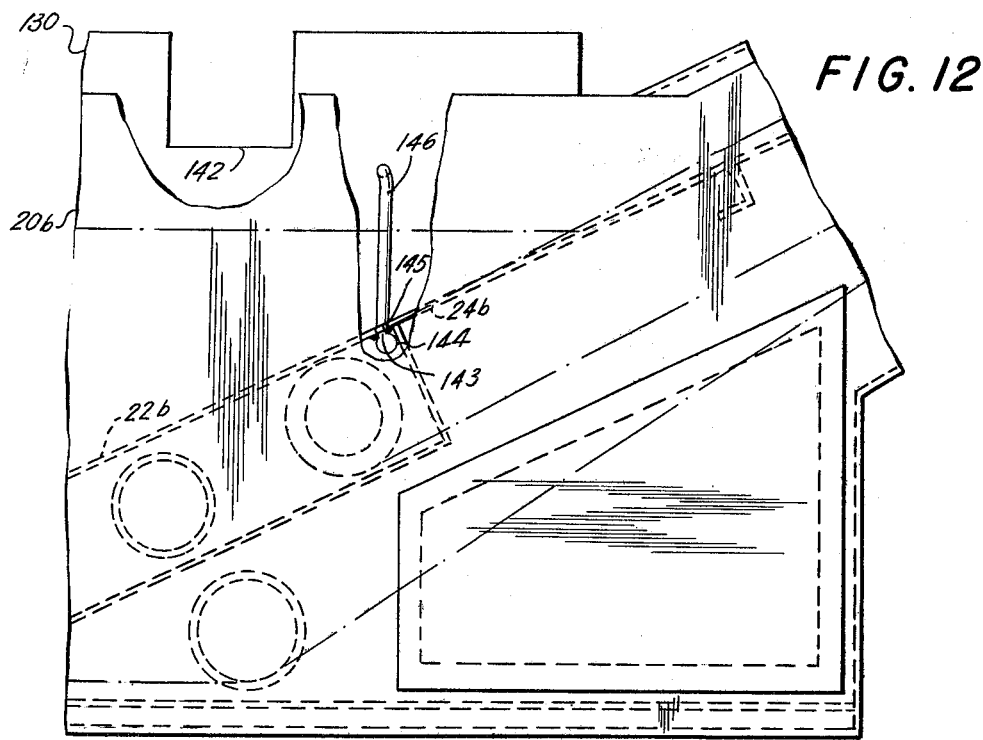
FIGURE 12 is a partial section of the embodiment of the invention shown in FIGURE 11 which also shows a unique weir feature and wetting tube.

Small diameter pipe 146 forms a liquid guide path from tank 130 to pipe 144 which has a slot 143 of from about 1/64- to 1/2-inch in diameter and is advantageously positioned to provide a wetting the bottom of filter media 24b-22b as it leaves the pervious face of the suction box. As indicated in FIGURE 12, the pipe slot is advantageously welded onto the inside of suction box 22b and its slot 143 is facing upwardly and registers with another slot 145 in the suction box itself. The two slots provide a conduit for water which wets the filter medium and thereby prevents air from being sucked from above the water level, through the filter media cross-section and into the suction box. As seen, the clean filtrate comes through pipe 146 and, by gravity flow, reaches the slotted pipe 144. This air path is especially troublesome if not sealed when the load of filtered solid at the discharge end of the suction box is so great that little filtering can be done therethrough and air is preferentially sucked in through the filter media cross-section. Such air path is undesirable.

What is claimed is:

1. A filtration apparatus having a tank for holding a mass of liquid to be filtered, a suction box having an open face within said tank, a strip of filter media arranged for passage over said open face, a continuous filter media support web carried over said open face and under said strip of filter media, and suction means communicating with said suction box providing means for removal of filtered liquid from said apparatus, said apparatus further comprising a continuous filter media support belt within said suction box, said belt being adapted to travel over said open face flush with said face of said suction box and having a plurality of spaced apart narrow bars extending across said open face and contacting the underside of said support web for carrying said filter media across said open face of said suction box, a frame mounted within said suction box on which support belt is mounted, said frame providing internal support means for said suction box.

2. The apparatus of claim 1 comprising additionally guide slots mounted within said suction box, providing means for removably placing said frame in said suction box.

3. A filtration apparatus having a tank for holding a mass of liquid to be filtered, a suction box having an open face within said tank, a strip of filter media arranged for passage over said face, and suction means communicating with said suction box for removal of filtered liquid from said apparatus, said apparatus further comprising a continuous filter media support belt, said belt being adapted to travel over said open face flush with said face of said suction box for carrying said filter media across the face of said suction box, and a continuous pervious filter media support web carried over said open face and under said filter media, a bowed lead-in form against which said web is trained and along which said web moves providing means for said web and said filter media to be gradually brought into contact before their passage over said suction box.

4. A filtration apparatus having a tank for holding a mass of liquid to be filtered, a suction box having an open face within said tank, a strip of filter media arranged for passage over said face, and suction means communicating with said suction box for removal of filtered liquid from said apparatus, said apparatus further comprising a continuous filter media support belt, said belt being adapted to travel over said open face flush with said face of said suction box and providing means for carrying said filter media across the face of said suction box, a continuous pervious filter media support web carried over said open face and under said filter media, and a bowed lead-in form providing means for said web and said filter media to be gradually brought into contact before their passage over said suction box, and an adjustable-tension roller of irregular surface placed contacting said filter media after it has contacted said web but before passage over said suction box.

5. A filtration apparatus having a tank for holding a mass of liquid to be filtered, a suction box having an open face within said tank, a strip of filter media arranged for passage over said face, means for motivating said filter media, and suction means communicating with said suction box for removal of filtered liquid from said apparatus, said apparatus further comprising a continuous filter media support belt, said belt being adapted to travel over said open face flush with said face of said suction box and providing means for carrying said filter media across the face of said suction box, a continuous pervious filter media support web carried over said open face and under said filter media, a bowed lead-in form providing means for said web and said filter media to be gradually brought into contact before their passage over said suction box, an adjustable roller of irregular surface placed contacting said filter media after it has contacted said web but before passage over said suction box, and an adjusting rod forming means for adjusting said irregular-surfaced roller.

6. A filtration apparatus having a tank for holding a mass of liquid to be filtered, a suction box having an open face within said tank, a strip of filter media arranged for passage over said face, and suction means communicating with said suction box for removal of filtered liquid from said apparatus, said apparatus further comprising a continuous pervious filter media support web carried over said open face and under said filter media, a bowed lead-in form providing means for said web and said filter media to be gradually brought into contact before their passage over said suction box, an adjustable roller of irregular surface placed contacting said filter media after it has contacted said web but before passage over said suction box and a tension-adjusting rod forming means for adjusting said irregular-surfaced roller in respect to magnitude and direction of tension.

References Cited

UNITED STATES PATENTS

| | | | |
|---|---|---|---|
| 450,094 | 4/1891 | Black | 210—400 X |
| 2,097,529 | 11/1937 | Nordell | 210—401 X |
| 3,091,336 | 5/1963 | Hirs | 210—111 |

JAMES L. DE CESARE, Primary Examiner

U.S. Cl. X.R.

210—387